US011553261B2

(12) United States Patent
Suzuki et al.

(10) Patent No.: US 11,553,261 B2
(45) Date of Patent: Jan. 10, 2023

(54) FUSION SPLICING DEVICE LOCK RELEASE SYSTEM

(71) Applicant: SUMITOMO ELECTRIC OPTIFRONTIER CO., LTD., Yokohama (JP)

(72) Inventors: Takahiro Suzuki, Yokohama (JP); Kazuyoshi Ooki, Yokohama (JP); Hideaki Yusa, Yokohama (JP); Takaharu Ohnishi, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/311,573

(22) PCT Filed: Dec. 24, 2019

(86) PCT No.: PCT/JP2019/050647
§ 371 (c)(1),
(2) Date: Jun. 7, 2021

(87) PCT Pub. No.: WO2020/138093
PCT Pub. Date: Jul. 2, 2020

(65) Prior Publication Data
US 2022/0078534 A1 Mar. 10, 2022

(30) Foreign Application Priority Data
Dec. 25, 2018 (JP) .............................. JP2018-241308

(51) Int. Cl.
*H04L 9/00* (2022.01)
*H04Q 11/00* (2006.01)

(52) U.S. Cl.
CPC ..... *H04Q 11/0067* (2013.01); *H04Q 11/0003* (2013.01); *H04Q 2011/0015* (2013.01); *H04Q 2011/0088* (2013.01)

(58) Field of Classification Search
CPC ..................................................... H04L 9/0838
See application file for complete search history.

(56) References Cited

U.S. PATENT DOCUMENTS 6,292,896 B1 * 9/2001 Guski ................... H04L 9/3228
713/169
6,729,550 B2 * 5/2004 Seita .................... G06Q 20/327
235/382

(Continued)

FOREIGN PATENT DOCUMENTS

JP 2004-240637 A 8/2004
JP 2007-004373 A 1/2007

(Continued)

OTHER PUBLICATIONS

Mar. 24, 2020 International Search Report issued in International Patent Application No. PCT/JP2019/050647.

*Primary Examiner* — Shi K Li
(74) *Attorney, Agent, or Firm* — Oliff PLC

(57) ABSTRACT

A system for releasing locking of a fusion splicer includes a fusion splicer, an information terminal, and a server. The fusion splicer locks a fusion-splicing function in accordance with a predetermined lock condition and releases the locked function in accordance with a release command input. The server includes a storage unit that stores authentication information provided by a user of the fusion splicer, a collation unit that collates authentication information provided from the information terminal with the authentication information stored in the storage unit, and a password issuance unit that issues a one-time password including at least a date in an algorithm when a collation result is (Continued)

favorable. The information terminal authenticates the one-time password in consideration of a day difference or a time difference between the information terminal and the server and applies the release command to the fusion splicer when an authentication result is favorable.

25 Claims, 12 Drawing Sheets

(56) References Cited

U.S. PATENT DOCUMENTS

| | | |
|---|---|---|
| 2006/0106606 A1 | 5/2006 | Labaton |
| 2010/0024022 A1 | 1/2010 | Wells et al. |
| 2013/0284377 A1 | 10/2013 | Takayanagi et al. |
| 2016/0277123 A1 | 9/2016 | Fink et al. |

FOREIGN PATENT DOCUMENTS

| | | |
|---|---|---|
| JP | 2012-141357 A | 7/2012 |
| JP | 2014-149559 A | 8/2014 |
| JP | 2017-224076 A | 12/2017 |

* cited by examiner

FUSION SPLICING DEVICE LOCK RELEASE SYSTEM

TECHNICAL FIELD

The present disclosure relates to a system for releasing locking of a fusion splicer. The present application claims the benefit of the priority based on Japanese Patent Application No. 2018-241308, filed Dec. 25, 2018, the entire contents disclosed in the application is incorporated herein by reference.

BACKGROUND ART

Patent Literature 1 discloses a fusion splicer for splicing optical fibers with each other.

CITATION LIST

Patent Literature

[Patent Literature 1] Japanese Unexamined Patent Publication No. 2012-141357

SUMMARY OF INVENTION

Technical Problem

The present disclosure provides a system for releasing locking of a fusion splicer. The system for releasing locking of a fusion splicer includes a fusion splicer configured to fusion-splice optical fibers, a first information terminal, and a server configured to communicate with the first information terminal via a communication network. The fusion splicer includes a communication unit configured to communicate with the first information terminal, and a lock processing unit. The lock processing unit locks at least one of functions of the fusion splicer in accordance with a predetermined lock condition and releases locking in accordance with a release command input from the first information terminal via the communication unit. The server includes a storage unit configured to store authentication information provided in advance by a user of the fusion splicer, a collation unit configured to collate authentication information provided from the first information terminal with authentication information stored in the storage unit, and a password issuance unit configured to issue a one-time password including at least a date in an algorithm when a collation result of the collation unit is favorable. The first information terminal includes a password authentication unit configured to authenticate the one-time password, and a release command applying unit configured to apply the release command to the fusion splicer when an authentication result of the password authentication unit is favorable. The password authentication unit authenticates the one-time password in consideration of a day difference or a time difference between a day and a time hold by the first information terminal and a day and a time hold by the server.

According to another aspect, the present disclosure provides a fusion splicer used in the foregoing system for releasing locking. According to still another aspect, the present disclosure provides a method for releasing locking of the fusion splicer where at least one of functions is locked, by using the foregoing system for releasing locking. According to further another aspect, the present disclosure provides a release program for causing a computer to execute each step of releasing locking of the fusion splicer in the foregoing system for releasing locking.

DESCRIPTION OF EMBODIMENT

Figure 1:
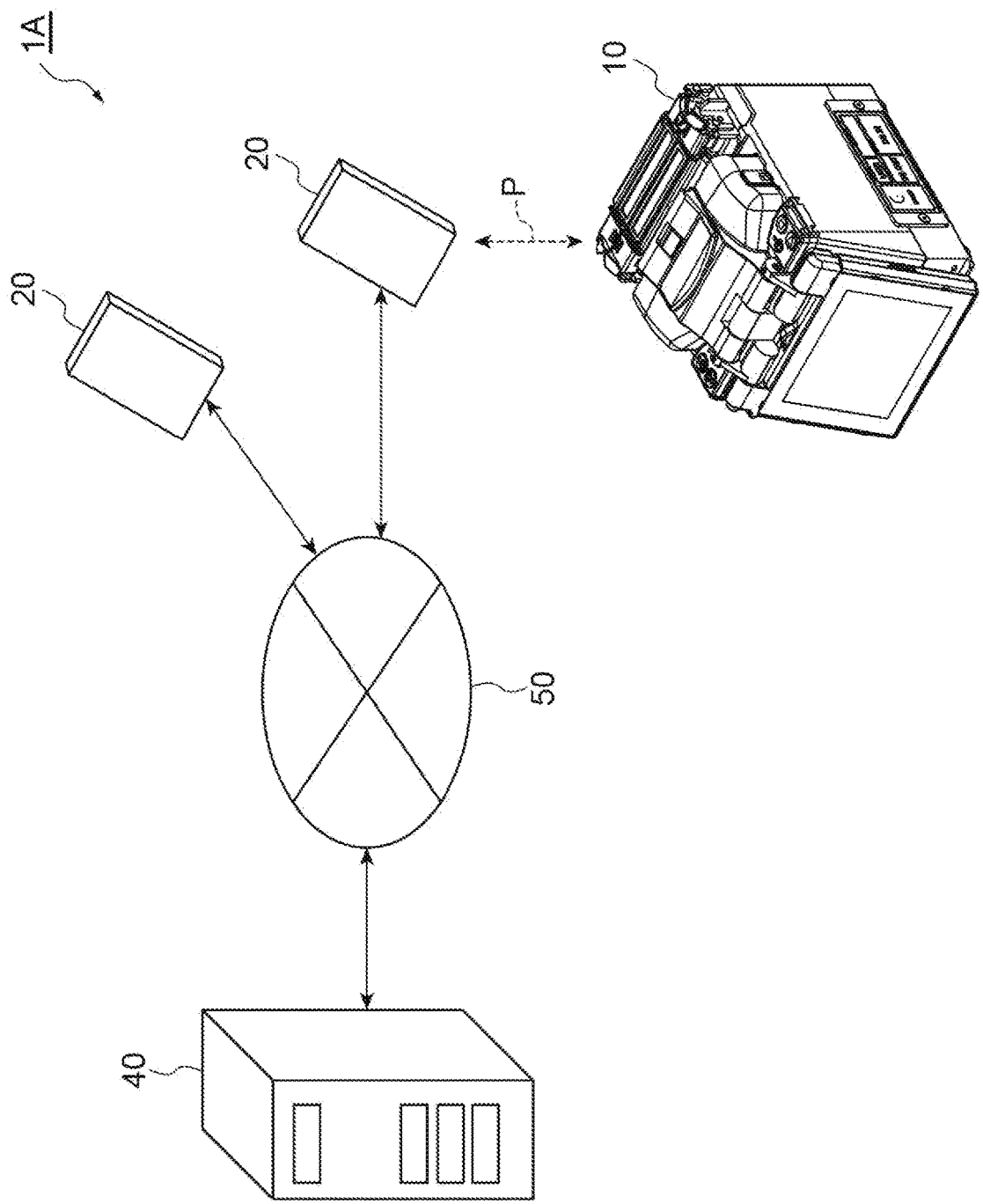
FIG. 1 is a view schematically illustrating a constitution of a system for releasing locking according to an embodiment.

[Problem to be Solved by the Present Disclosure]

For example, the fusion splicer disclosed in Patent Literature 1 is used at a site where optical fibers are being laid. At the laying site, a user of the fusion splicer also performs work other than fusion work of optical fibers. Thus, the user may be absent from the fusion splicer, and the fusion splicer may be stolen at this time. It is conceivable that a security function such as a password-based lock mechanism be provided in the fusion splicer against such theft. However, with a security function such as a password, it is difficult to inhibit theft of the fusion splicer itself. In addition, there is also a possibility that the fusion splicer will be resold if the password can be deciphered, and therefore further improvement is required from the viewpoint of inhibiting theft.

Under such circumstances, systems capable of inhibiting theft of a fusion splicer have been examined. For example, it is conceivable that an information terminal such as a smartphone be paired with a fusion splicer in advance and at least some of functions of the fusion splicer be locked and made unusable when the information terminal and the fusion splicer move away from each other by a predetermined distance or longer. Since this method makes a stolen fusion splicer no longer able to be used, a sufficient theft inhibition effect can be expected. On the other hands, when a user of a fusion splicer has lost or the like a paired information terminal in this method, the fusion splicer is locked and made unusable, and thus work using the fusion splicer has to be interrupted. In such a case, fusion-splicing work cannot be performed within a construction period.

[Advantageous Effects of the Present Disclosure]

According to the present disclosure, locking of a fusion splicer can be released even when a paired information terminal is lost.

[Description of Embodiments of the Present Disclosure]

First, embodiments of the present disclosure will be enumerated and described. According to an aspect of the present disclosure, there is provided a system for releasing locking of a fusion splicer including a fusion splicer configured to fusion-splice optical fibers, a first information terminal, and a server configured to communicate with the first information terminal via a communication network. The fusion splicer includes a communication unit configured to communicate with the first information terminal, and a lock processing unit. The lock processing unit locks at least one of functions of the fusion splicer in accordance with a predetermined lock condition and releases locking in accordance with a release command input from the first information terminal via the communication unit. The server has a storage unit configured to store authentication information provided in advance by a user of the fusion splicer, a collation unit configured to collate authentication information provided from the first information terminal with the authentication information stored in the storage unit, and a password issuance unit configured to issue a one-time password including at least a date in an algorithm when a collation result of the collation unit is favorable. The first information terminal includes a password authentication unit configured to authenticate the one-time password, and a release command applying unit configured to apply the release command to the fusion splicer when an authentication result of the password authentication unit is favorable. The password authentication unit authenticates the one-time password in consideration of a day difference or a time difference between a day and a time hold by the first information terminal and a day and a time hold by the server.

In this system, the fusion splicer locks at least one of the functions of the fusion splicer in accordance with a predetermined lock condition. At this time, a user of the fusion splicer can provide authentication information to the server through the first information terminal. The server issues a one-time password including at least a date in an algorithm in consideration of safety when a collation result of the authentication information is favorable. The first information terminal applies a release command to the fusion splicer when an authentication result of the one-time password is favorable. Accordingly, locking of the fusion splicer is released, and thus the user can continuously perform fusion-splicing work.

In the foregoing system, a one-time password including at least a date in an algorithm is used. However, fusion splicers are used all aver the world, and a case in which a location of a server and a location of a fusion splicer and a first information terminal are away from each other can also be considered. In such a case, due to the day difference between the locations thereof there is concern that a one-time password may not effectively function. Thus, in the foregoing system, the first information terminal authenticates a one-time password in consideration of a day difference or a time difference between a day and a time hold by the first information terminal and a day and a time hold by the server. Accordingly, a release command can be appropriately applied to the fusion splicer regardless of the day difference or the time difference between the locations, and thus locking of the fusion splicer can be reliably released at any place in the world. Here, "a day difference" denotes a date shift based on a difference between the time zones.

The foregoing system may further include a second information terminal configured to communicate with the server via the communication network and paired with the fusion splicer in advance. The first information terminal may not be paired with the fusion splicer. The predetermined lock condition may be that the second information terminal and the fusion splicer move away from each other by a predetermined distance or longer. In this system, the second information terminal is paired with the fusion splicer in advance, and when the second information terminal and the fusion splicer move away from each other by a predetermined distance or longer, at least some of the functions of the fusion splicer are locked. Accordingly, since a stolen fusion splicer is no longer able to be used, a sufficient theft inhibition effect can be expected. In addition, when a user of the fusion splicer has lost the paired second information terminal, the user can obtain a one-time password by providing authentication information to the server through the first information terminal which has not been paired. Hence, the user can continuously perform fusion-splicing work.

In the foregoing system, the password authentication unit may allow the one-time password having a day difference of plus or minus one day with respect to a date hold by the first information terminal. Alternatively, the first information terminal may further includes a time difference identification unit identifying a time difference between a day and a time hold by the first information terminal and a day and a time hold by the server. The password authentication unit may authenticate the one-time password in consideration of a time difference identified by the time difference identification unit. For example, according to these methods, regardless of the day difference or the time difference between days and times hold by the first information terminal and the server, locking of the fusion splicer can be reliably released.

According to another aspect of the present disclosure, there is provided a fusion splicer used in any of the foregoing systems for releasing locking. This fusion splicer includes the communication unit configured to communicate with the first information terminal, and the lock processing unit. The lock processing unit locks at least one of functions of the fusion splicer in accordance with a predetermined lock condition and releases the lock in accordance with a release command input from the first information terminal via the communication unit.

According to another aspect of the present disclosure, there is provided a method for releasing locking including releasing the lock of the fusion splicer where one of functions is locked, by using any of the foregoing fusion splicer lock release systems.

According to another aspect of the present disclosure, there is provided a release program for causing a computer to execute each step of releasing locking of the fusion splicer in any of the foregoing systems for releasing locking of a fusion splicer.

[Details of Embodiments of Present Disclosure]

Fusion splicer lock release systems according to embodiments of the present disclosure will be described below with reference to the drawings. The present invention is not limited to the examples. The present invention is indicated by the claims, and it is intended to include all the changes within meanings and a range equivalent to the claims.

FIG. 1 is a view schematically illustrating a constitution of a system 1A according to an embodiment. The system 1A includes a fusion splicer 10, at least two information terminals 20, and a server 40. The fusion splicer 10 is a device that fusion-splices optical fibers. The information terminals 20 are portable wireless communication terminals such as smartphones, for example. The fusion splicer 10 is constituted to be able to communicate with the information terminals 20 through wireless connection, for example. One information terminal 20 (second information terminal) and the fusion splicer 10 are paired with each other in advance (dashed line arrow P in the diagram). Another information terminal 20 (first information terminal) and the fusion splicer 10 are not paired with each other in advance. Details of pairing will be described below.

The server 40 is a management server generalizing the entire system and is a computer which can communicate with each of the information terminals 20 via an information communication network 50. The information communication network 50 is the internet, for example. The server 40 is located in a certain area on earth, and the fusion splicer 10 and each of the information terminals 20 are located in a different area having a time difference with respect to the location area of the server 40.

Figure 2:
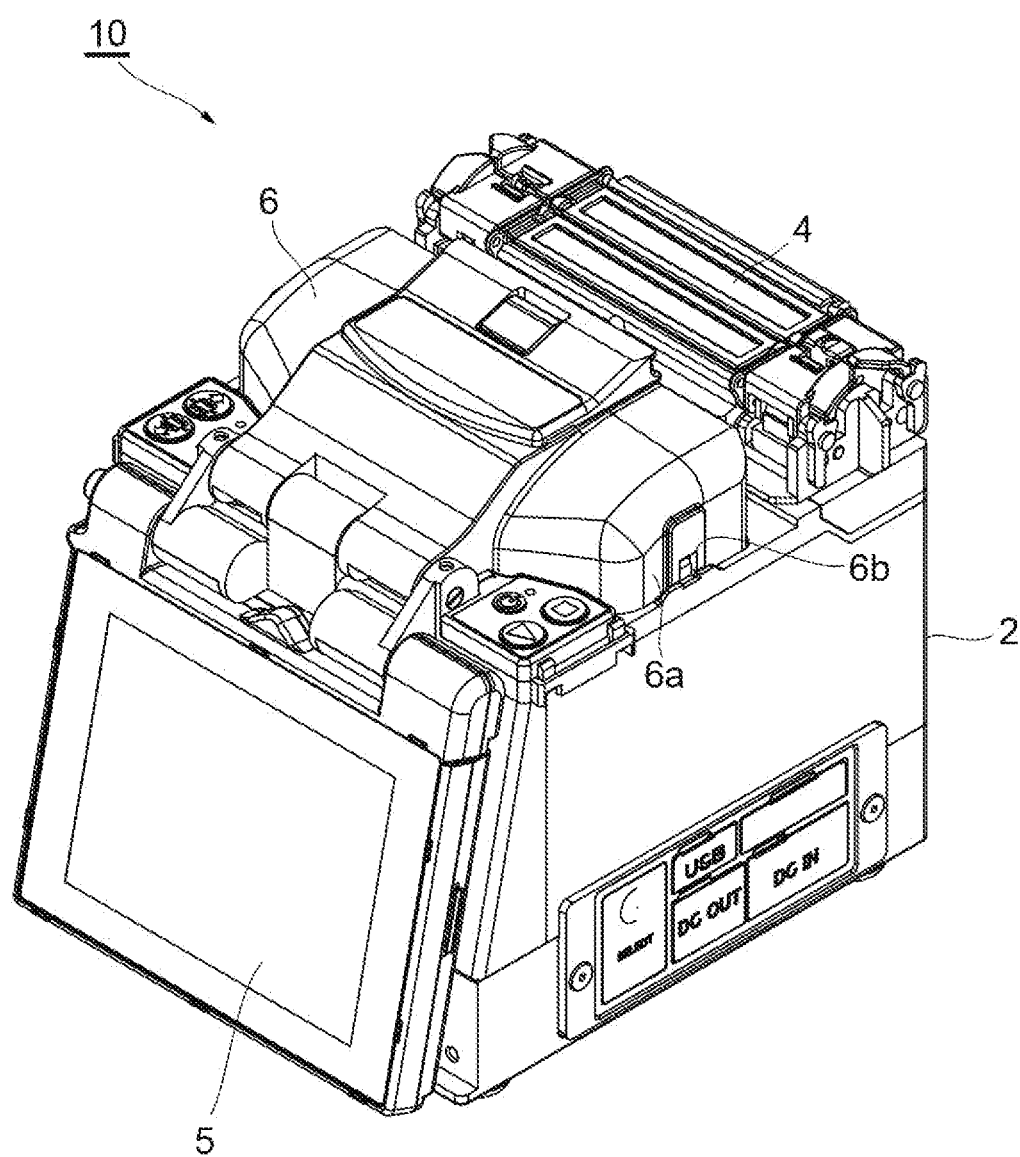
FIG. 2 is a perspective view illustrating an external appearance of a fusion splicer to which the system for releasing locking illustrated in FIG. 1 is applied and illustrating a state in which a windshield cover is closed.
Figure 3:
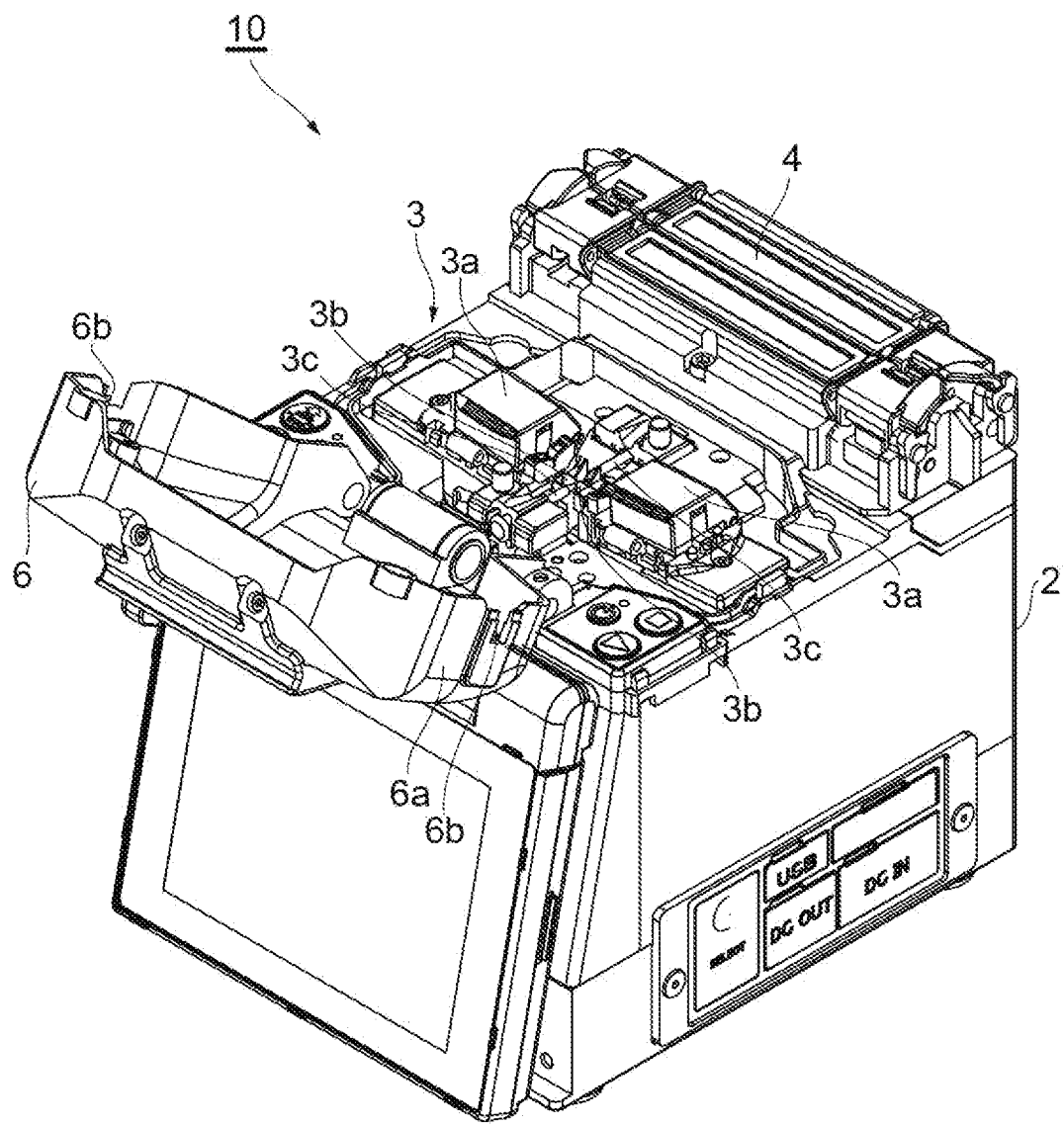
FIG. 3 is a perspective view illustrating an external appearance of the fusion splicer and illustrating a state in which the windshield cover is open.

FIGS. 2 and 3 are perspective views illustrating external appearances of the fusion splicer 10. FIG. 2 illustrates an external appearance of a state in which a windshield cover is closed, and FIG. 3 illustrates an external appearance in a state in which the windshield cover is open such that an internal structure of the fusion splicer 10 can be seen. The fusion splicer 10 is a device that fusion-splices optical fibers and includes a box-shaped housing 2, as illustrated in FIGS. 2 and 3. In an upper portion of the housing 2, a fusion unit 3 that fusion-splices optical fibers, and a heater 4 that heats and contracts a fiber reinforcing sleeve covering a fusion-splicing portion of the optical fibers fused by the fusion unit 3 are provided. The fusion splicer 10 includes a monitor 5 that displays an image of a fusion-splicing condition between optical fibers captured by a camera (not illustrated) disposed inside the housing 2. Moreover, the fusion splicer 10 includes a windshield cover 6 that prevents wind from entering the fusion unit 3.

The fusion unit 3 includes a holder mounting unit in which a pair of optical fiber holders 3a can be mounted, a pair of fiber positioning units 3b, and a pair of discharging electrodes 3c. Optical fibers (fusion targets) are respectively held and fixed by the optical fiber holders 3a, and each of the optical fiber holders is mounted and fixed in the holder mounting unit. The fiber positioning units 3b are disposed between the optical fiber holders 3a to position tip portions of optical fibers respectively held by the optical fiber holders 3a. The discharging electrodes 3c are electrodes disposed between the fiber positioning units 3b to fusion tips of optical fibers by arc discharging.

The windshield cover 6 is joined to the housing 2 such that the fusion unit 3 is covered in a manner of being able to be opened and closed freely. An introduction port 6b for introducing an optical fiber to the fusion unit 3 (that is, to each of the optical fiber holders 3a) is formed on each side surface 6a of the windshield cover 6.

Figure 4:
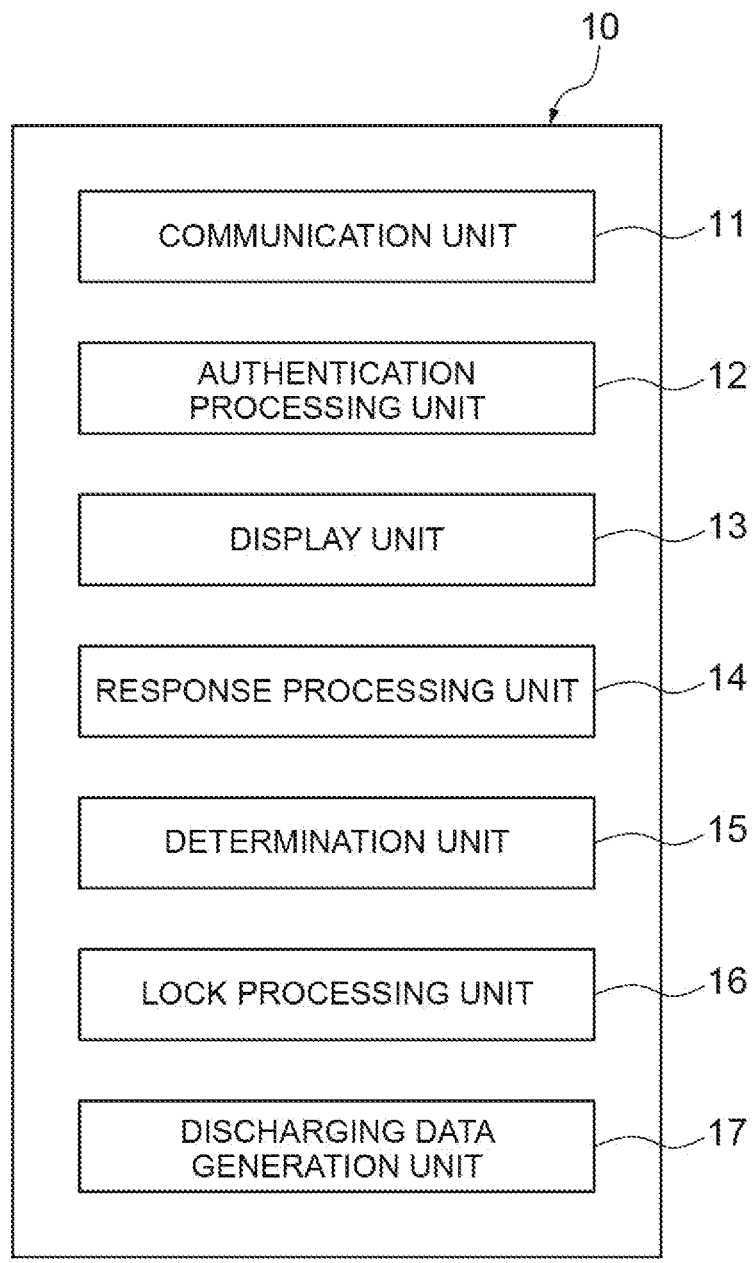
FIG. 4 is a block diagram illustrating a functional constitution of the fusion splicer illustrated in FIGS. 2 and 3.
Figure 5:
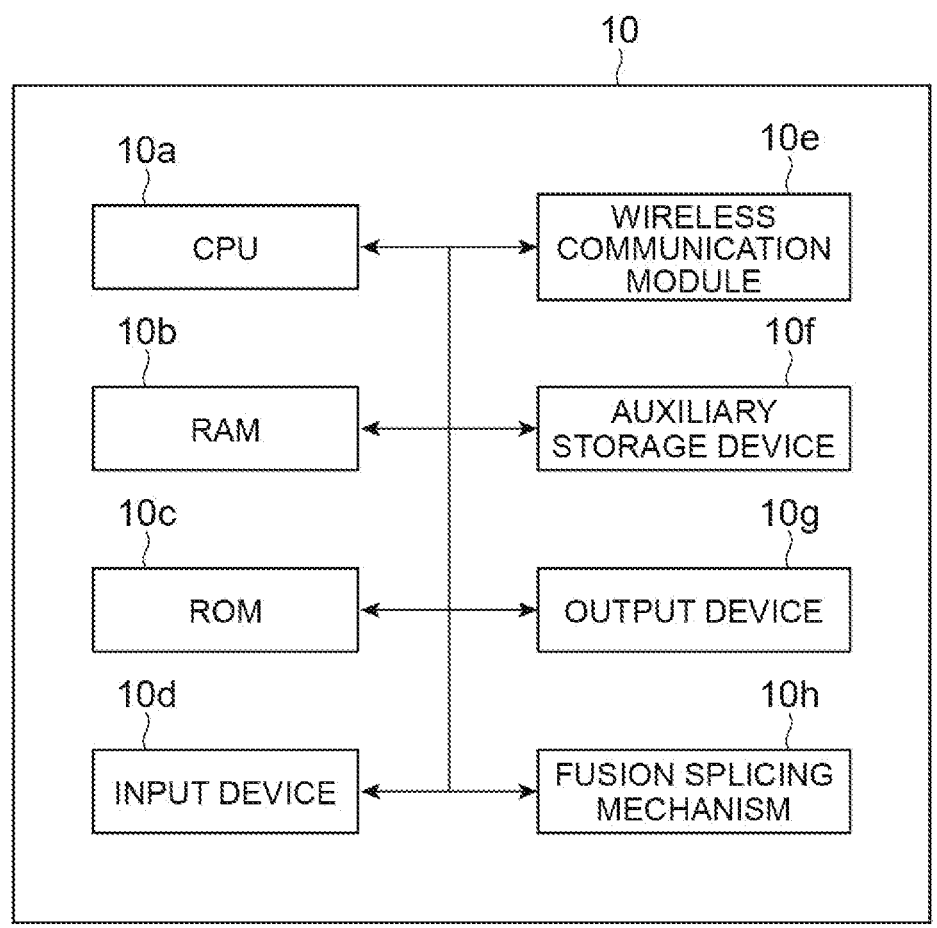
FIG. 5 is a block diagram illustrating a hardware constitution of the fusion splicer illustrated in FIGS. 2 and 3.

FIG. 4 is a block diagram illustrating a functional constitution of the fusion splicer 10. FIG. 5 is a block diagram illustrating a hardware constitution of the fusion splicer 10. As illustrated in FIG. 4, the fusion splicer 10 functionally includes a communication unit 11, an authentication processing unit 12, a display unit 13, a response processing unit 14, a determination unit 15, a lock processing unit 16, and a discharging data generation unit 17. As illustrated in FIG. 5, the fusion splicer 10 is constituted to include a computer serving as a control unit thereof and provided with hardware such as a CPU 10a, a RAM 10b, ROM 10c, an input device 10d, a wireless communication module 10e, an auxiliary storage device 10f, and an output device 10g. Each function of the fusion splicer 10 is realized when these constituent elements operate in accordance with a program or the like stored in a storage device of the computer. In addition, the fusion splicer 10 includes various fusion splicing mechanisms 10h in addition to the control unit.

The communication unit 11 is a part communicating with each of the information terminals 20. The communication unit 11 performs wireless communication conforming to IEEE 802.11 (registered trademark: Wi-Fi) or IEEE 802.15.1 (registered trademark: Bluetooth), for example, with the information terminals 20.

The authentication processing unit 12 is a part performing authentication work such as pairing processing with respect to the information terminal 20 via the communication unit 11. The authentication processing unit 12 extracts pairing information from a signal transmitted from the information terminal 20 as a message signal (for example, a text file) including the pairing information and received using the communication unit 11 and acquires four-digit numerical information which becomes pairing information, for example. The authentication processing unit 12 transfers this acquired four-digit numerical information to the display unit 13, causes the monitor or the like to display the number for a predetermined time, and causes the display unit 13 to display a selection screen of "perform or do not perform pairing" with respect to the information terminal 20. When selection information indicating "perform pairing" with respect to the information terminal 20 is received from the display unit 13, the authentication processing unit 12 generates a message signal indicating the fact and transmits the generated signal to the information terminal 20 via the communication unit 11. During the pairing processing, the authentication processing unit 12 acquires an identification ID (for example, a phone number, a mail address, or the like of the information terminal 20) identifying the individual information terminal 20.

The display unit 13 is constituted to include the monitor 5 described above for example and displays a four-digit number required during pairing processing with respect to the information terminal 20 and the selection screen showing "perform or do not perform pairing" with respect to the information terminal 20 or the like, on the basis of instruction information from the authentication processing unit 12. The display unit 13 causes the monitor 5 or the like to display a four-digit number on the basis of the four-digit number of the pairing information acquired by the authentication processing unit 12 and displays the selection screen of "perform or do not perform pairing" with respect to the information terminal 20. When "perform pairing" with respect to the information terminal 20 is selected, the display unit 13 transfers information indicating the selection to the authentication processing unit 12.

After pairing processing (authentication) with respect to the information terminal 20 is completed, the response processing unit 14 makes a predetermined response, for example, a reply of one dispatch confirmation signal for one received message regarding a message signal (condition confirmation information) sent from the information terminal 20 in a predetermined cycle, to the information terminal 20 at a lower protocol level via the communication unit 11.

The determination unit 15 is a part determining whether or not the information terminal 20 and the fusion splicer 10 which have been paired move away from each other by a predetermined distance or longer on the basis of communication conditions of wireless communication with respect to the information terminal 20. The determination unit 15 confirms the presence of a message signal or a pairing number in a file wirelessly transmitted from the information terminal 20 in a predetermined cycle after pairing processing and performs processing of deleting the received message signal when it can be confirmed that a message signal is being sent in each predetermined cycle or when the pairing numbers coincide with each other. On the other hand, the determination unit 15 determines that the information terminal 20 and the fusion splicer 10 which have been paired move away from each other by a predetermined distance or longer when no message signal is present (is transmitted) or the pairing numbers do not match each other during confirmation processing performed in a predetermined cycle. The determination unit 15 may determine that they move away from each other by a predetermined distance or longer when the absence of a message signal or mismatch of the pairing numbers continuously occurs a stipulated number of times (for example, three times). Accordingly, it is possible to determine with higher accuracy that the information terminal 20 and the fusion splicer 10 which have been paired move away from each other by a predetermined distance or longer.

The lock processing unit 16 is a part locking all or some of functions of the fusion splicer 10 such that they are made unusable when a predetermined lock condition is met. More specifically, in this case, the lock processing unit 16 electronically locks all or some of fusion splicing functions (the fusion splicing mechanisms 10h such as fusion between fibers by arc discharging, heating of the fiber reinforcing sleeve, or the like) of the fusion splicer 10 such that they are made unusable. For example, a predetermined lock condition denotes a case in which the determination unit 15 determines that the information terminal 20 and the fusion splicer 10 which have been paired move away from each other by a predetermined distance or longer. The lock processing unit 16 temporarily releases locking of the functions of the fusion splicer 10 on the basis of a release command from an unpaired information terminal 20 which is different from the paired information terminal 20. A temporary release period is one to several days, for example. When the predetermined period described above has elapsed after locking is temporarily released, the lock processing unit 16 performs processing of canceling lock release and puts the fusion splicer 10 in a locked state again.

The discharging data generation unit 17 generates information (data) related to discharging power when a discharging test is performed during daily pre-work inspection. This information related to discharging power is generated every time pre-work inspection is performed. That is, one piece of information is generated for one work day. This information is provided to the paired information terminal 20 via the communication unit 11.

Figure 6:
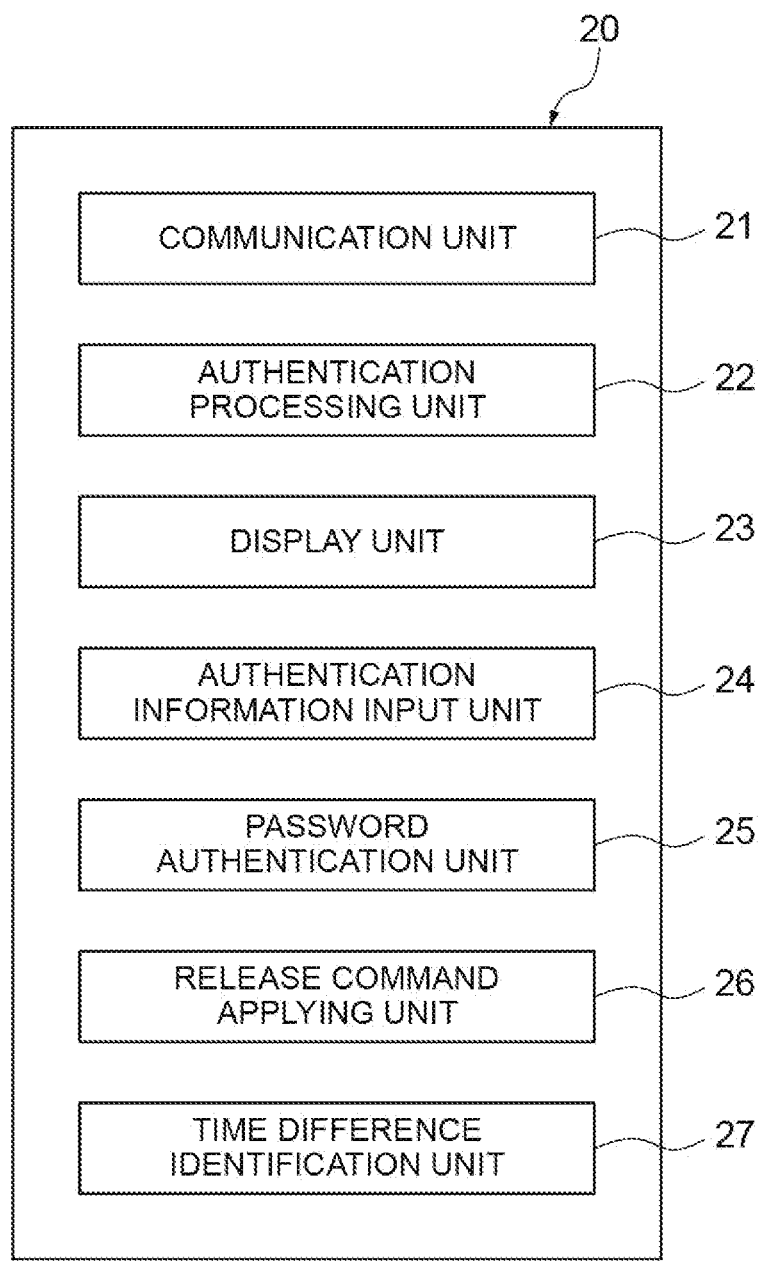
FIG. 6 is a block diagram illustrating a functional constitution of each of information terminals constituting the system for releasing locking illustrated in FIG. 1.
Figure 7:
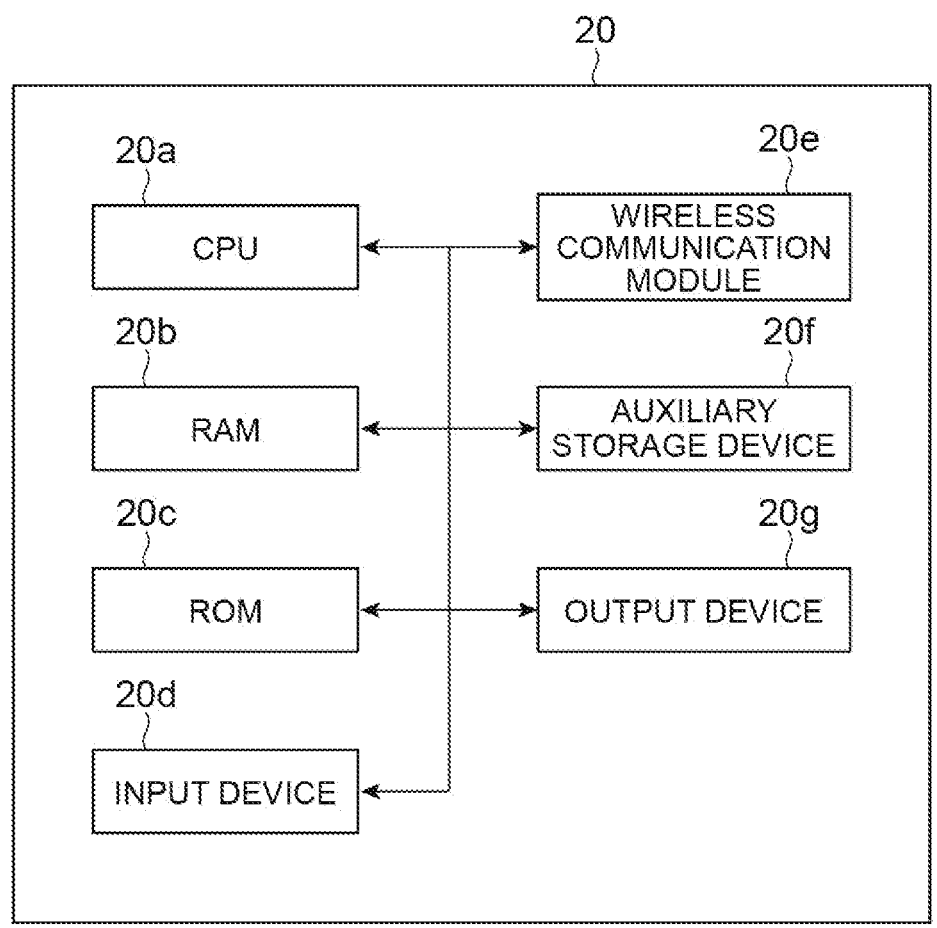
FIG. 7 is a block diagram illustrating a hardware constitution of each of the information terminals illustrated in FIG. 6.

FIG. 6 is a block diagram illustrating a functional constitution of each of the information terminals 20. FIG. 7 is a block diagram illustrating a hardware constitution of each of the information terminals 20. In the present embodiment, a role of the paired information terminal 20 and a role of another information terminal 20 which is not paired differ from each other. Common software is built into these information terminals 20, and each of the functions of the information terminal 20 illustrated in FIG. 6 is realized by the common software (computer program).

As illustrated in FIG. 6, each of the information terminals 20 includes a communication unit 21, an authentication processing unit 22, a display unit 23, an authentication information input unit 24, a password authentication unit 25, a release command applying unit 26, and a time difference identification unit 27. As illustrated in FIG. 7, the information terminal 20 is constituted to include a computer provided with hardware such as a CPU 20a, a RAM 20b, a ROM 20c, an input device 20d, a wireless communication module 20e, an auxiliary storage device 20f, and an output device 20g. The information terminal 20 realizes each of the functions illustrated in FIG. 6 when these constituent elements operate in accordance with a program or the like stored in a storage device of the computer. This program can be installed in the computer of each of the information terminals 20 from an external server device or the like. These programs may be distributed in a state of being stored in a recording medium such as a CD-ROM, a DVD-ROM, or a semiconductor memory or may be distributed via a communication network. The programs used in the fusion splicer 10 and the like may be similar thereto.

The communication unit 21 is constituted of the wireless communication module 20e such as a wireless LAN module built into the terminal, for example, and receives and transmits various kinds of signals through wireless communication with respect to the fusion splicer 10. The communication unit 21 performs communication conforming to IEEE 802.11 or IEEE 802.15.1, for example, to correspond to the wireless communication standard of the fusion splicer 10. Other bands or communication standards may be adopted as long as wireless communication can be performed with the fusion splicer 10. The communication unit 21 receives and transmits various kinds of signals with respect to the server 40 via the information communication network 50 such as the internet. For this reason, the communication unit 21 may also use the wireless LAN module described above, or each of the information terminals 20 may include another communication module.

The authentication processing unit 22 performs authentication work such as pairing processing with respect to the fusion splicer 10. As an example, the authentication processing unit 22 transmits a message signal including a four-digit number which is pairing information for performing pairing processing to the fusion splicer 10 via the communication unit 21. The authentication processing unit 22 completes pairing processing with respect to the fusion splicer 10 when a message signal including information of "perform pairing" is received from the fusion splicer 10. The authentication processing unit 22 transmits an identification ID (for example, a phone number, a mail address, or the like of the information terminal 20) identifying the individual information terminal 20 to the fusion splicer 10 via the communication unit 21 during the pairing processing described above.

The display unit 23 displays not only a four-digit number which is pairing information but also displays information related to discharging power provided from the discharging data generation unit 17 of the fusion splicer 10, for example. Accordingly, a worker can record discharging power during daily pre-work inspection in a recording sheet or the like.

Figure 8:
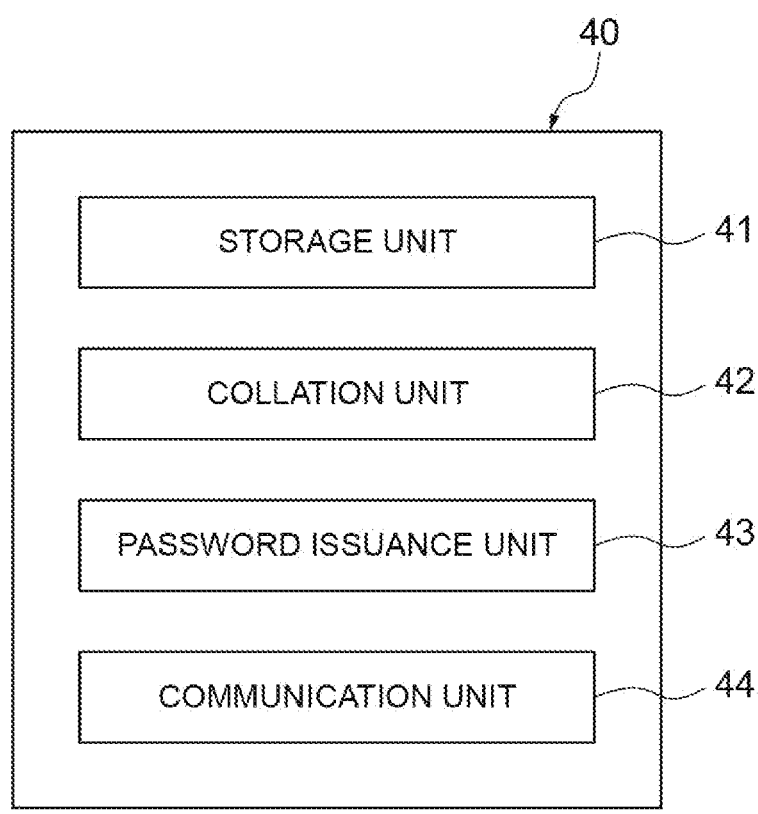
FIG. 8 is a block diagram illustrating a functional constitution of a server constituting the system for releasing locking illustrated in FIG. 1.
Figure 9:
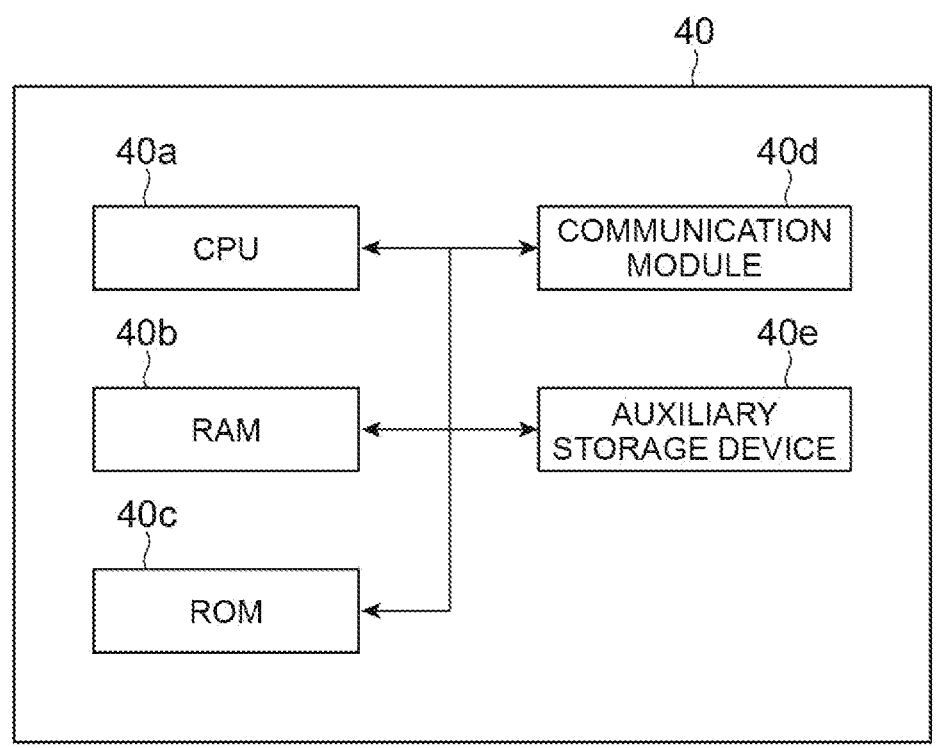
FIG. 9 is a block diagram illustrating a hardware constitution of the server illustrated in FIG. 8.

Here, functions of the server 40 will be described before other functions of each of the information terminals 20 are described. FIG. 8 is a block diagram illustrating a functional constitution of the server 40. FIG. 9 is a block diagram illustrating a hardware constitution of the server 40. As illustrated in FIG. 8, the server 40 functionally includes a storage unit 41, a collation unit 42, a password issuance unit 43, and a communication unit 44. As illustrated in FIG. 9, the server 40 is constituted to include a computer serving as a control unit thereof and provided with hardware such as a CPU 40a, a RAM 40b, a ROM 40c, a communication module 40d, and an auxiliary storage device 40e. Each function of the server 40 is realized when these constituent elements operate in accordance with a program or the like stored in a storage device of the computer.

The storage unit 41 is a part storing authentication information provided in advance by a user of the fusion splicer 10. Examples of authentication information include a credit card number of a user and various kinds of information (a native place and the like) which is difficult for a stranger to know without permission of the user. Alternatively, authentication information may be information related to fusion splicing work performed by the fusion splicer 10 in the past, for example, information related to daily discharging power. For example, these pieces of authentication information are provided to the server 40 in advance (or every day) from the paired information terminal 20.

When a user of the fusion splicer 10 has lost the paired information terminal 20, for example, the user transmits authentication information to the server 40 using another (an unpaired) information terminal 20. The collation unit 42 collates authentication information provided from another information terminal 20 which is not paired with the authentication information stored in the storage unit 41. The collation unit 42 judges that a collation result is favorable when these pieces of authentication information match each other (or meet an authentication condition).

The password issuance unit 43 issues a one-time password when a collation result of the collation unit is favorable. The one-time password includes at least a date in an algorithm and is originally valid only for this day. As an example, in addition to a date, time information may be included in the algorithm. For example, a one-time password is information constituted of a plurality of numbers, letters, symbols, and the like. As an example, in addition to a date, identification information (a serial number or the like) of the fusion splicer 10 may be included in the algorithm.

The communication unit 44 is a part communicating with each of the information terminals 20 via the information communication network 50 such as the interne. The communication unit 44 receives authentication information provided by a user of the fusion splicer 10 via the information communication network 50. The communication unit 44 transmits a one-time password issued by the password issuance unit 43 to the unpaired information terminal 20 via the information communication network 50.

With reference to FIG. 6 again, other functions of each of the information terminals 20 will be described. The authentication information input unit 24 is a part receiving an input of authentication information to be transmitted to the server 40 from a user when the user of the fusion splicer 10 has lost the paired information terminal 20. The authentication information input unit 24 is realized by the input device 20d illustrated in FIG. 7, for example.

The password authentication unit 25 is a part for authenticating a one-time password. The password authentication unit 25 judges whether or not a one-time password input by a worker is authorized. The password authentication unit 25 authenticates a one-time password in consideration of a day difference or a time difference between a day and a time hold by the information terminal 20 and a day and a time hold by the server 40. The expression "in consideration of a day difference or a time difference" means that even when a day and a time hold by the information terminal 20 and a day and a time hold by the server 40 differ from each other, if it is caused due to the difference between the location areas of the information terminal 20 and the server 40, mismatching of the one-time password regarding the date or the time is disregard and the one-time password is authenticated.

As an example, the password authentication unit 25 may allow a one-time password having a day difference of plus or minus one day with respect to the date hold by the information terminal 20. Specifically, the password authentication unit 25 prepares a one-time password corresponding to the date hold by the information terminal 20 and two one-time passwords respectively having day differences of plus one day and minus one day with respect to the date hold by the information terminal 20. When any one of the three one-time passwords and an input one-time password coincide with each other, the one-time password is authenticated as an authorized one-time password. In every area on earth, the day difference is one day at the maximum. According to such a method, a one-time password can be authenticated in consideration of the day difference caused due to the difference between the location areas of the information terminal 20 and the server 40.

As another example, the password authentication unit 25 may authenticate a one-time password in consideration of a time difference between a day and a time hold by the information terminal 20 and a day and a time hold by the server 40. Specifically, the password authentication unit 25 prepares a one-time password corresponding to a day and a time obtained by subtracting the foregoing time difference from a day and a time hold by the information terminal 20. When this one-time password and a one-time password input by a user coincide with each other, the one-time password is authenticated as an authorized one-time password. A time difference between a day and a time hold by the information terminal 20 and a day and a time hold by the server 40 can be identified by the time difference identification unit 27 which will be described below.

The release command applying unit 26 is a part for releasing locking of at least some of the functions of the fusion splicer 10 from the unpaired information terminal 20 when the functions thereof are locked. When an authentication result of the password authentication unit 25 is favorable, the release command applying unit 26 generates a release command signal and transmits the release command signal to the fusion splicer 10 via the communication unit 21. The fusion splicer 10 releases locking upon reception of a release command signal. Accordingly, locking of the fusion splicer 10 can be released from the information terminal 20.

The time difference identification unit 27 acquires positional information of the fusion splicer 10 and identifies a time difference between a day and a time hold by the information terminal 20 and a day and a time hold by the server 40. The time difference identification unit 27 is constituted to include a global positioning system (UPS) or the like, for example, and acquires positional information using the UPS or the like. The time difference identification unit 27 may acquire positional information of the fusion splicer 10 at all times or regularly. The time difference identification unit 27 stores information related to the location area (time zone) of the server 40 in advance. Identified time difference information is utilized for judging a one-time password in the password authentication unit 25.

Figure 10:
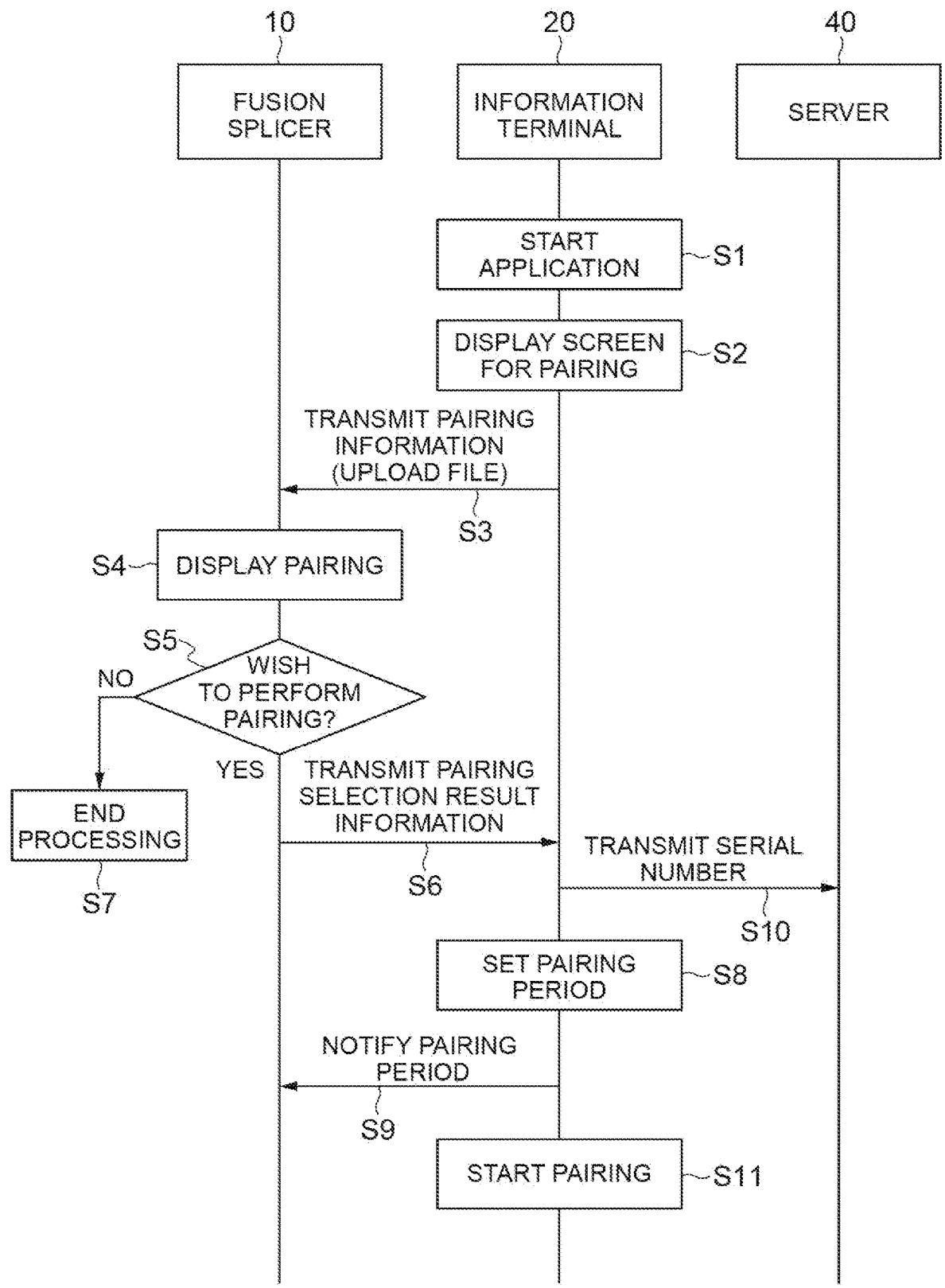
FIG. 10 is a sequence diagram for performing pairing processing between a fusion splicer and one information terminal.

Next, details of pairing will be described with reference to FIG. 10. FIG. 10 is a sequence diagram for performing pairing processing between the fusion splicer 10 and one information terminal 20 in the system 1A of the present embodiment.

As illustrated in FIG. 10, first, an application for pairing is started by a user in one information terminal 20 (Step S1). In the information terminal 20, upon start of this application, a screen for pairing is displayed, and a four-digit number for pairing is displayed in the screen for a predetermined time (for example, 10 seconds as a pairing standby time) by the display unit 23 (Step S2). Substantially at the same time as the screen in Step S2 is displayed, the information terminal 20 uploads (transmits) a message signal (for example, a TXT file) including pairing information for mutual authentication to the fusion splicer 10 using the communication unit 21 (Step S3). This message signal is not limited to a text file.

Subsequently, on the fusion splicer 10 where a message signal including pairing information is received using the communication unit 11, the authentication processing unit 12 extracts four-digit numerical value information for pairing included in the message signal and displays the four-digit number in the monitor or the like. The fusion splicer 10 causes the authentication processing unit 12 to display a selection screen such as "perform or do not perform pairing" with respect to the information terminal 20 in the monitor (Step S4). A user of the fusion splicer 10 (the same as a user of the information terminal 20) selects a selection item of either "perform or do not perform pairing" (Step S5). When the authentication processing unit 12 receives selection to perform pairing, the fusion splicer 10 generates a message signal for pairing (pairing selection result information) and transmits the message signal to the information terminal 20 via the communication unit 11 (Step S6). When selection not to perform pairing is received, the fusion splicer 10 causes the authentication processing unit 12 to end the processing (Step S7).

Subsequently, the information terminal 20 which has received information for pairing (pairing selection result information) sets a pairing period. The information terminal 20 causes the display unit 23 to display pairing periods (10 minutes, 1 hour, 1 day, 30 days, and the like) in a display as a selection screen and sets a desired period selected by a worker (Step S8), for example. The information terminal 20 transmits information related to the desired period (pairing setting information) to the paired fusion splicer 10 (Step S9). The information terminal 20 may transmit information such as a serial number received from the fusion splicer 10 to the server 40 (Step S10). Pairing starts according to the processing described above (Step S11).

Figure 11:
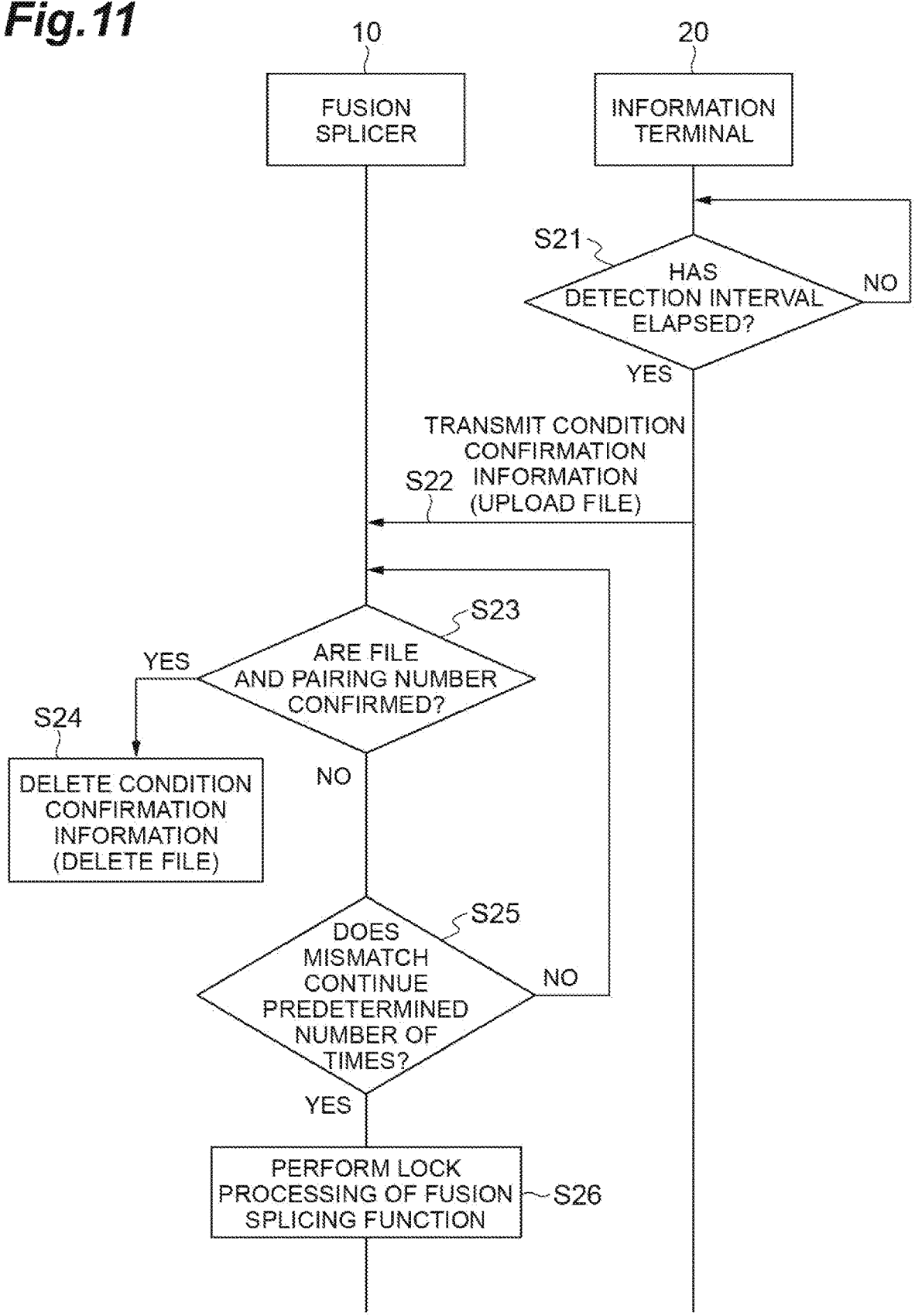
FIG. 11 is a sequence diagram illustrating details of lock processing.

Next, lock processing of the fusion splicing mechanisms in the fusion splicer 10 will be described. FIG. 11 is a sequence diagram illustrating details of lock processing. After a lapse of a predetermined detection interval (Step S21), the information terminal 20 transmits a message signal asking whether or not the fusion splicer 10 is present nearby (condition confirmation information, for example, a TXT file) to the fusion splicer 10 (Step S22). This signal includes pairing information including a pairing number. This message signal is not limited to a text file.

Subsequently, the fusion splicer 10 which has received this extracts the pairing number from the signal, and the lock processing unit 16 confirms the pairing number in the file (Step S23). when the pairing number matches the number stored in a host device in advance, the lock processing unit 16 deletes the received message signal (condition confirmation information) (Step S24). When the pairing number does not match in Step S24, the process returns to Step S23. The fusion splicer 10 performs this confirmation work in a predetermined cycle set in advance and confirms whether the pairing number does not match or whether failure of receiving a message signal (failure of confirmation) from the information terminal 20 continues a predetermined number of times (Step S25).

Subsequently, in the fusion splicer 10, when the determination unit 15 judges in determination of Step S25 that the pairing number does not match or failure of receiving a message signal (failure of confirmation) from the information terminal 20 continues a predetermined number of times, it is judged that the fusion splicer 10 is in a state of moving away from the information terminal 20 by a predetermined distance or longer, and the process proceeds to Step S26. The lock processing unit 16 locks a fusion function(s) of the fusion splicer 10 (Step S26). Accordingly, when the fusion splicer 10 is stolen or the like, it can be made unusable.

Incidentally, the foregoing sequence is not limited to a case in which the fusion splicer 10 is stolen, and even when a user has lost the paired information terminal 20, the fusion function(s) of the fusion splicer 10 is locked by the lock processing unit 16. Thus, the locking can be temporarily released using another information terminal 20 which is not paired, in the system 1A of the present embodiment.

Figure 12:
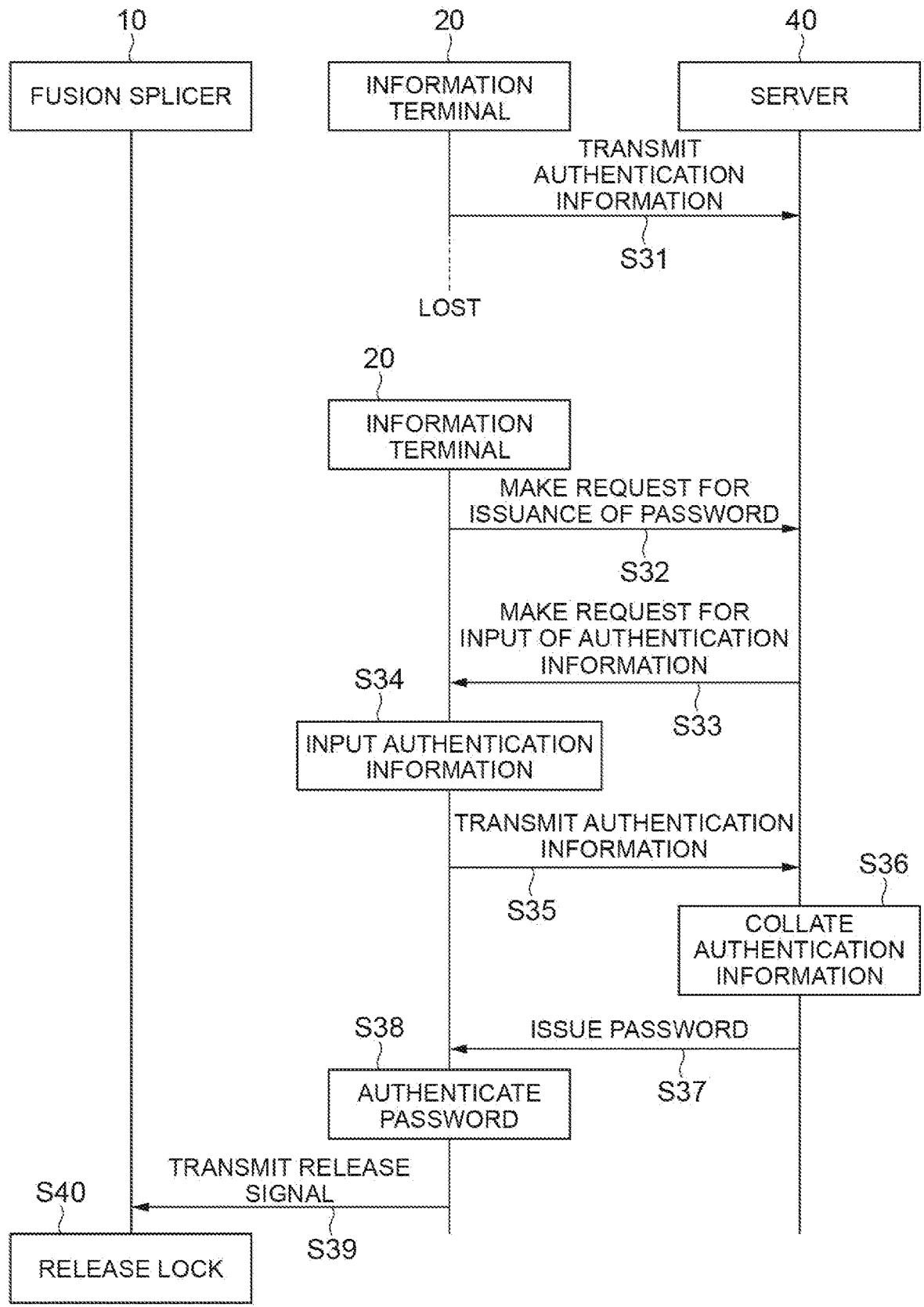
FIG. 12 is a sequence diagram illustrating a method for allowing a user to release locking of the fusion splicer when the user has lost or the like a paired information terminal.

FIG. 12 is a sequence diagram illustrating a method for allowing a user to release locking of the fusion splicer 10 when the user has lost or the like the paired information terminal 20. As preparation, during pairing or the pairing period, authentication information is transmitted to the server 40 from the paired information terminal 20 (Step S31). Alternatively, authentication information may be transmitted to the server 40 from another information terminal different from the paired information terminal 20. As described above, authentication information is a credit card number of the user or various kinds of information as native place and the like) which is difficult for a stranger to know without permission of the user, for example. Alternatively, authentication information is information related to fusion splicing work performed by the fusion splicer 10 in the past, for example, information related to daily discharging power. The authentication information transmitted to the server 40 is saved in the storage unit 41 of the server 40.

Subsequently, when the user has lost the paired information terminal 20, the user makes a request for issuance of a one-time password to the server 40 through another information terminal 20 which is not paired (Step S32). When this request for issuance is received, the server 40 makes a request for an input of authentication information to the user through the information terminal 20 (Step S33). For example, a request for an input of authentication information is displayed in the display unit 23 of the information terminal 20. When this display is confirmed, the user inputs authentication information to the information terminal 20 through the authentication information input unit 24 (Step S34). The user inputs these pieces of authentication information to the information terminal 20 via the input device 20*d*, for example. When authentication information is information related to fusion-splicing work which has been performed in the past, for example, information for the last few days (as an example, for three days) may be input.

Subsequently, the information terminal 20 transmits authentication information to the server 40 via the communication unit 21 based on an operation of the user (Step S35). The server 40 collates received authentication information with the authentication information saved in the storage unit 41 (Step S36). When a collation result is favorable, the password issuance unit 43 issues a one-time password including at least a date in an algorithm (Step S37). This one-time password is transmitted to the information terminal 20 via the communication unit 44.

Subsequently, the information terminal 20 presents the one-time password to the user through the output device 20*g*. The user inputs the presented one-time password to the application through the input device 20*d* of the information terminal 20. The information terminal 20 performs authentication processing of the input one-time password using the password authentication unit 25 (Step S38). The password authentication unit 25 judges whether or not the one-time password transmitted from the server 40 is authorized. At this time, as described above, the password authentication unit 25 authenticates the one-time password in consideration of a day difference or a time difference between a day and a time hold by the information terminal 20 and a day and a time hold by the server 40.

When an authentication result obtained by the password authentication unit 25 is favorable, the information terminal 20 generates a release command signal using the release command applying unit 26 and transmits the release command signal to the fusion splicer 10 through the communication unit 21 (Step S39). The lock processing unit 16 of the fusion splicer 10 temporarily releases lock of the fusion splicing function(s) upon reception of the release command signal (Step S40). Accordingly, the user can continuously perform fusion splicing work.

Effects obtained by the system 1A of the present embodiment which has been described above will be described. The system 1A uses a one-time password including at least a date in an algorithm. Accordingly, it is possible to enhance safety of a password and reduce a situation of unauthorized lock release of the fusion splicing functions. On the other hand, it is also conceivable that the fusion splicer 10 be used all over the world and a time zone of a location of the server 40 and a time zone of a location of the fusion splicer 10 and the information terminal 20 differ from each other. In such a case, due to the day difference between the locations thereof, there is concern that a one-time password may not effectively function. Thus, in the system 1A of the present embodiment, the information terminal 20 authenticates a one-time password in consideration of a day difference or a time difference between a day and a time hold by the information terminal 20 and a day and a time hold by the server 40. Accordingly, a release command can be appropriately applied to the fusion splicer 10 regardless of the day difference or the time difference between the locations, and thus locking of the fusion splicer 10 can be reliably released at any place in the world.

As in the present embodiment, a predetermined lock condition may be that the information terminal 20 and the fusion splicer 10 which have been paired move away from each other by a predetermined distance or longer. Accordingly, since a stolen fusion splicer 10 is no longer able to be used, a sufficient theft inhibition effect can be expected. When a user of the fusion splicer 10 has lost the paired information terminal 20, the user can obtain a one-time password by providing authentication information to the server 40 through the unpaired information terminal 20. Hence, the user can continuously perform fusion-splicing work.

As in the present embodiment, the password authentication unit 25 may allow a one-time password having a day difference of plus or minus one day with respect to a day and a time hold by the information terminal 20. Alternatively, the information terminal 20 may further have the time difference identification unit 27 identifying a time difference between a day and a time hold by the information terminal 20 and a day and a time hold by the server 40. The password authentication unit 25 may authenticate a one-time password in consideration of a time difference identified by the time difference identification unit 27. According to these methods, regardless of the day difference or the time difference between days and times hold by the unpaired information terminal 20 and the server 40, locking of the fusion splicer 10 can be reliably released.

Hereinabove, the system for releasing the locking according to the present embodiment has been described, but the present invention is not limited thereto and various modifications can be applied.

REFERENCE SIGNS LIST

1A System
2 Housing
3 Fusion unit
3a Optical fiber holder
3b Fiber positioning unit
3c Discharging electrode
4 Heater
5 Monitor
6 Windshield cover
6a Side surface
6b Introduction port
10 Fusion splicer
11 Communication unit
12 Authentication processing unit
13 Display unit
14 Response processing unit
15 Determination unit
16 Lock processing unit
17 Discharging data generation unit
20 Information terminal
21 Communication unit
22 Authentication processing unit
23 Display unit
24 Authentication information input unit
25 Password authentication unit
26 Release command applying unit
27 Time difference identification unit
40 Server
41 Storage unit
42 Collation unit
43 Password issuance unit
44 Communication unit
50 Information communication network

The invention claimed is:

1. A system for releasing locking of a fusion splicer, the system comprising:
a fusion splicer configured to fusion-splice optical fibers;
a first information terminal; and
a server configured to communicate with the first information terminal via a communication network,
wherein the fusion splicer comprises
a communication unit configured to communicate with the first information terminal, and
a lock processing unit configured to lock at least one of functions of the fusion splicer in accordance with a predetermined lock condition and release locking in accordance with a release command input from the first information terminal via the communication unit,
wherein the server comprises
a storage unit configured to store authentication information provided in advance by a user of the fusion splicer,
a collation unit configured to collate authentication information provided from the first information terminal with the authentication information stored in the storage unit, and a password issuance unit configured to issue a one-time password including at least a date in an algorithm when a collation result of the collation unit is favorable, wherein the first information terminal comprises
a password authentication unit configured to authenticate the one-time password, and
a release command applying unit configured to apply the release command to the fusion splicer when an authentication result of the password authentication unit is favorable, wherein the password authentication unit authenticates the one-time password in consideration of a day difference or a time difference between a day and a time held by the first information terminal and a day and a time held by the server, wherein the system further comprises a second information terminal configured to communicate with the server via the communication network, the second information terminal being paired with the fusion splicer in advance, wherein the first information terminal is not paired with the fusion splicer, and wherein the predetermined lock condition is that the second information terminal and the fusion splicer move away from each other by a predetermined distance or longer.

2. The system for releasing locking of a fusion splicer according to claim 1,
wherein the password authentication unit allows the one-time password having a day difference of plus or minus one day with respect to a date held by the first information terminal.

3. The system for releasing locking of a fusion splicer according to claim 1,
wherein the first information terminal further comprises a time difference identification unit configured to identify a time difference between a day and a time held by the first information terminal and a day and a time held by the server, and
wherein the password authentication unit authenticates the one-time password in consideration of a time difference identified by the time difference identification unit.

4. A fusion splicer used in the system for releasing locking of a fusion splicer according to claim 1.

5. A method for releasing locking, comprising:
releasing the locking of the fusion splicer where at least one of functions is locked, by using the system for releasing locking of a fusion splicer according to claim 1.

6. A non-transitory computer-readable storage medium storing a releasing program for causing a computer to execute each step of releasing locking of the fusion splicer in the system for releasing a fusion splicer according to claim 1.

7. A system for releasing locking of a fusion splicer, the system comprising:
a lock processing unit configured to lock at least one of functions of the fusion splicer in accordance with a predetermined lock condition;
a communication unit configured to receive a one-time password including at least a date in an algorithm, the one-time password being issued when a server collates first authentication information provided by a first information terminal with second authentication information provided by a user of the fusion splicer and a collation result of the collating is favorable, wherein the second authentication information is information sent to the server from a second information terminal different from the first information terminal when the second information terminal is paired with the fusion splicer;
a password authentication unit configured to authenticate the one-time password in consideration of a day difference or a time difference between a day and a time held by the first information terminal and a day and a time held by the server; and
a release command applying unit configured to apply a release command that releases the locked function of the fusion splicer, to the fusion splicer when an authentication result of the password authentication unit is favorable, and
wherein the lock processing unit temporarily releases the locked function of the fusion splicer in accordance with the release command.

8. The system for releasing locking of a fusion splicer according to claim 7,
wherein the password authentication unit allows the one-time password having a day difference of plus or minus one day with respect to a date held by the first information terminal.

9. The system for releasing locking of a fusion splicer according to claim 7, further comprising,
a time difference identification unit configured to identify a time difference between a day and a time held by the first information terminal and a day and a time held by the server,
wherein the password authentication unit authenticates the one-time password in consideration of a time difference identified by the time difference identification unit.

10. The system for releasing locking of a fusion splicer according to claim 7,
wherein the second authentication information includes at least one piece of a credit card number information, the user's personal information, and information related to fusion splicing work performed by the fusion splicer.

11. The system for releasing locking of a fusion splicer according to claim 7,
wherein the lock processing unit temporarily releases the locked function of the fusion splicer in accordance with the release command within one to several days.

12. A method for releasing locking of a fusion splicer by a lock releasing system, the method comprising:
locking at least one of functions of the fusion splicer in accordance with a predetermined lock condition;
receiving a one-time password including at least a date in an algorithm, the one-time password being issued when a server collates first authentication information provided by a first information terminal with second authentication information provided by a user of the fusion splicer and a collation result of the collating is favorable, wherein the second authentication information is information sent to the server from a second information terminal different from the first information terminal when the second information terminal is paired with the fusion splicer;
authenticating the one-time password in consideration of a day difference or a time difference between a day and a time held by the first information terminal and a day and a time held by the server;
applying a release command that releases the locked function of the fusion splicer, to the fusion splicer when an authentication result of the password authenticating is favorable, and temporarily releasing the locked function of the fusion splicer in accordance with the release command.

13. A non-transitory computer-readable storage medium storing a releasing program for causing a computer to execute:
receiving a one-time password including at least a date in an algorithm, the one-time password being issued when a server collates first authentication information provided by a first information terminal with second authentication information provided by a user of a fusion splicer and a collation result of the collating is favorable, wherein the second authentication information is information sent to the server from a second information terminal different from the first information terminal when the second information terminal is paired with the fusion splicer;
authenticating the one-time password in consideration of a day difference or a time difference between a day and a time held by the first information terminal and a day and a time held by the server; and
applying a release command that temporarily releases the locked function of the fusion splicer, to the fusion splicer when an authentication result of the password authenticating is favorable.

14. A system for releasing locking of a fusion splicer, the system comprising:
a fusion splicer configured to fusion-splice optical fibers;
a first information terminal; and
a server configured to communicate with the first information terminal via a communication network,
wherein the fusion splicer comprises
a communication unit configured to communicate with the first information terminal, and
a lock processing unit configured to lock at least one of functions of the fusion splicer in accordance with a predetermined lock condition and release locking in accordance with a release command input from the first information terminal via the communication unit,
wherein the server comprises
a storage unit configured to store authentication information provided in advance by a user of the fusion splicer,
a collation unit configured to collate authentication information provided from the first information terminal with the authentication information stored in the storage unit, and
a password issuance unit configured to issue a one-time password including at least a date in an algorithm when a collation result of the collation unit is favorable,
wherein the first information terminal comprises
a password authentication unit configured to authenticate the one-time password,
a time difference identification unit configured to identify a time difference between a current local day and a current local time held by the first information terminal and a current local day and a current local time held by the server, and
a release command applying unit configured to apply the release command to the fusion splicer when an authentication result of the password authentication unit is favorable,
wherein the password authentication unit authenticates the one-time password in consideration of a day difference or a time difference between a day and a time held by the first information terminal and a day and a time held by the server, and
the password authentication unit authenticates the one-time password in consideration of a time difference identified by the time difference identification unit.

15. The system for releasing locking of a fusion splicer according to claim 14, wherein the password authentication unit allows the one-time password having a day difference of plus or minus one day with respect to a date held by the first information terminal.

16. A fusion splicer used in the system for releasing locking of a fusion splicer according to claim 14.

17. A method for releasing locking, comprising:
releasing the locking of the fusion splicer where at least one of functions is locked, by using the system for releasing locking of a fusion splicer according to claim 14.

18. A non-transitory computer-readable storage medium storing a releasing program for causing a computer to execute each step of releasing locking of the fusion splicer in the system for releasing a fusion splicer according to claim 14.

19. A system for releasing locking of a fusion splicer, the system comprising:
a lock processing unit configured to lock at least one of functions of the fusion splicer in accordance with a predetermined lock condition;
a communication unit configured to receive a one-time password including at least a date in an algorithm, the one-time password being issued when a server collates first authentication information provided by a first information terminal with second authentication information provided by a user of the fusion splicer and a collation result of the collating is favorable;
a password authentication unit configured to authenticate the one-time password in consideration of a day difference or a time difference between a day and a time held by the first information terminal and a day and a time held by the server;
a time difference identification unit configured to identify a time difference between a current local day and a current local time held by the first information terminal and a current local day and a current local time held by the server; and
a release command applying unit configured to apply a release command that releases the locked function of the fusion splicer, to the fusion splicer when an authentication result of the password authentication unit is favorable, and
wherein the password authentication unit authenticates the one-time password in consideration of a time difference identified by the time difference identification unit, and
wherein the lock processing unit temporarily releases the locked function of the fusion splicer in accordance with the release command.

20. The system for releasing locking of a fusion splicer according to claim 19, wherein the password authentication unit allows the one-time password having a day difference of plus or minus one day with respect to a date held by the first information terminal.

21. The system for releasing locking of a fusion splicer according to claim 19, wherein the second authentication information includes at least one piece of a credit card number information, the user's personal information, and information related to fusion splicing work performed by the fusion splicer.

22. The system for releasing locking of a fusion splicer according to claim 21, wherein the lock processing unit temporarily releases the locked function of the fusion splicer in accordance with the release command within one to several days.

23. A system for releasing locking of a fusion splicer, the system comprising:
- a fusion splicer configured to fusion-splice optical fibers;
- a first information terminal; and
- a server configured to communicate with the first information terminal via a communication network,
- wherein the fusion splicer comprises
  - a communication unit configured to communicate with the first information terminal, and
  - a lock processing unit configured to lock at least one of functions of the fusion splicer in accordance with a predetermined lock condition and release locking in accordance with a release command input from the first information terminal via the communication unit,
- wherein the server comprises
  - a storage unit configured to store authentication information provided in advance by a user of the fusion splicer,
  - a collation unit configured to collate authentication information provided from the first information terminal with the authentication information stored in the storage unit, and
  - a password issuance unit configured to issue a one-time password including at least a date in an algorithm when a collation result of the collation unit is favorable,
- wherein the first information terminal comprises
  - a password authentication unit configured to authenticate the one-time password, and
  - a release command applying unit configured to apply the release command to the fusion splicer when an authentication result of the password authentication unit is favorable,
- wherein the password authentication unit authenticates the one-time password in consideration of a day difference or a time difference between a day and a time held by the first information terminal and a day and a time held by the server, and
- wherein the authentication information stored in the storage unit includes information related to fusion splicing work performed by the fusion splicer.

24. The system for releasing locking of a fusion splicer according to claim 23, wherein the authentication information stored in the storage unit includes information related to discharging power.

25. A system for releasing locking of a fusion splicer, the system comprising:
- a fusion splicer configured to fusion-splice optical fibers;
- a first information terminal; and
- a server configured to communicate with the first information terminal via a communication network,
- wherein the fusion splicer comprises
  - a communication unit configured to communicate with the first information terminal, and
  - a lock processing unit configured to lock at least one of functions of the fusion splicer in accordance with a predetermined lock condition and release locking in accordance with a release command input from the first information terminal via the communication unit,
- wherein the server comprises
  - a storage unit configured to store authentication information provided in advance by a user of the fusion splicer,
  - a collation unit configured to collate authentication information provided from the first information terminal with the authentication information stored in the storage unit, and
  - a password issuance unit configured to issue a one-time password including at least a date in an algorithm when a collation result of the collation unit is favorable,
- wherein the first information terminal comprises
  - a password authentication unit configured to authenticate the one-time password, and
  - a release command applying unit configured to apply the release command to the fusion splicer when an authentication result of the password authentication unit is favorable,
- wherein the password authentication unit authenticates the one-time password in consideration of a day difference or a time difference between a day and a time held by the first information terminal and a day and a time held by the server, and
- wherein the fusion splicer further comprises a discharging data generation unit configured to generate information related to discharge power when a discharging test is performed, and the storage unit of the server stores the information related to discharge power as the authentication information.

* * * * *